(12) United States Patent
Ting

(10) Patent No.: US 8,107,232 B2
(45) Date of Patent: Jan. 31, 2012

(54) EXTERNAL HARD DISK BOX

(76) Inventor: Shao-Chieh Ting, Banchiau (TW)

( * ) Notice: Subject to any disclaimer, the term of this patent is extended or adjusted under 35 U.S.C. 154(b) by 196 days.

(21) Appl. No.: 12/715,865

(22) Filed: Mar. 2, 2010

(65) Prior Publication Data

US 2011/0216497 A1    Sep. 8, 2011

(51) Int. Cl.
*G06F 1/16* (2006.01)
(52) U.S. Cl. ............... 361/679.33; 360/245.2; 345/522; 206/320
(58) Field of Classification Search ............. 360/129, 360/97.02, 16, 17, 245.2; 361/679.33, 679.39, 361/679.21, 679.31, 679.08, 679.02, 679.09, 361/679.34, 679.35, 679.37; 312/223.2, 312/223.1, 237, 219, 213, 7.2; 248/60, 631, 248/636, 308.3, 544, 680; 206/308.1, 320, 206/307, 454; 345/173, 174, 156, 592, 522, 345/630

See application file for complete search history.

(56) References Cited

U.S. PATENT DOCUMENTS

2010/0232064 A1* 9/2010 Lim et al. .................... 360/129
2010/0296191 A1* 11/2010 Kim et al. ................. 360/97.02

* cited by examiner

*Primary Examiner* — Hung Duong
(74) *Attorney, Agent, or Firm* — Muncy, Geissler, Olds & Lowe, PLLC

(57) ABSTRACT

The present invention discloses an external hard disk box. An upper cover and a lower cover of the box are positioned and fixed by soft silicon rings or silicon covers, without requiring any screw. In addition, a data transmission line associated with the external hard disk box can be accommodated; therefore, a user needs not to carry another data transmission line when going out. A top of the soft silicon ring is provided with grooves and a bottom of the soft silicon ring is provided with pillars which can act as foot pads to connect with the grooves of another external hard disk. Therefore, the present invention is provided with functions of stacking and shock-proofing.

2 Claims, 9 Drawing Sheets

EXTERNAL HARD DISK BOX

BACKGROUND OF THE INVENTION a) Field of the Invention

The present invention relates to an external hard disk box and more particularly to a hard disk box which can be assembled easily, can be carried conveniently, is suitable for stacking and is provided with a shock-proofing effect.

b) Description of the Prior Art

External hard disk boxes used on existing markets are mostly assembled by screws and do not have a shock-proof protection structure inside and outside the boxes. In addition, data transmission lines are separated with the hard disk boxes; therefore, it is not convenient to carry and use by users.

On the other hand, for the external hard disk boxes sold on the existing markets, bottom surfaces thereof are all not provided with skid-proof pads and are difficult to be stacked; hence, surfaces of the boxes can be easily scratched to affect beautifulness while using hard disks.

As a result, through provision of soft silicon rings and silicon covers to the external hard disk box of the present invention, the box can be assembled conveniently, is carried easily, can be stacked and is shock-proofed.

SUMMARY OF THE INVENTION

The primary object of the present invention is to provide an external hard disk box which is able to overcome the aforementioned shortcomings, achieving effects of being easily assembled, carried conveniently, suitable for stacking and shock-proofed.

A second object of the present invention is to provide an external hard disk box which uses a screw-free design wherein soft silicon rings or silicon covers are employed for positioning and fixing, thereby facilitating assembling and dismantling.

A third object of the present invention is to provide an external hard disk box, wherein through the provision of soft silicon covers, a data transmission line associated with the external hard disk box can be accommodated, thereby facilitating carrying and in a mean time assuring that the data line will not be lost.

A fourth object of the present invention is to provide an external hard disk box, wherein through grooves and pillars on the soft silicon covers and silicon rings, the hard disk box is skid-proofed and can be stacked up while being used.

A fifth object of the present invention is to provide an external hard disk box, wherein through the provision of soft silicon covers inside or outside the hard disk box, a function of shock-proofing a hard disk can be achieved.

To enable a further understanding of the said objectives and the technological methods of the invention herein, the brief description of the drawings below is followed by the detailed description of the preferred embodiments.

BRIEF DESCRIPTION OF THE DRAWINGS

FIGS. 1-2, 2-2 and 3-2 show three-dimensional exploded views of an external hard disk box of the present invention.

FIGS. 1-3, 2-3 and 3-3 show three-dimensional exploded views of an external hard disk box of the present invention, at another view angle.

FIGS. 1-4 and 2-4 show three-dimensional schematic views of a stack of external hard disk box of the present invention.

DETAILED DESCRIPTION OF THE PREFERRED EMBODIMENTS

Figure 1:
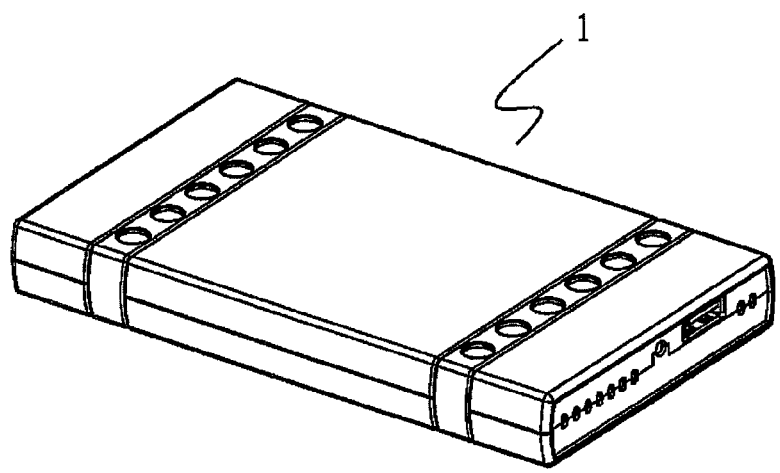
FIGS. 1-1, 2-1 and 3-1 show three-dimensional views of an external hard disk box of the present invention.
Figures 1, 2:
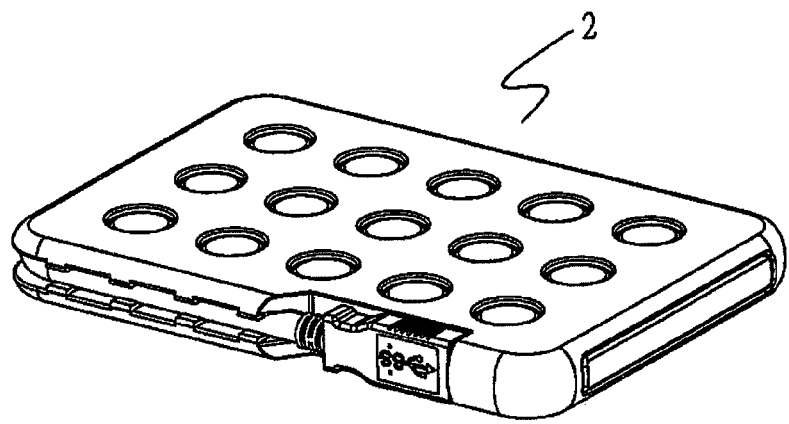
Figures 1, 3:
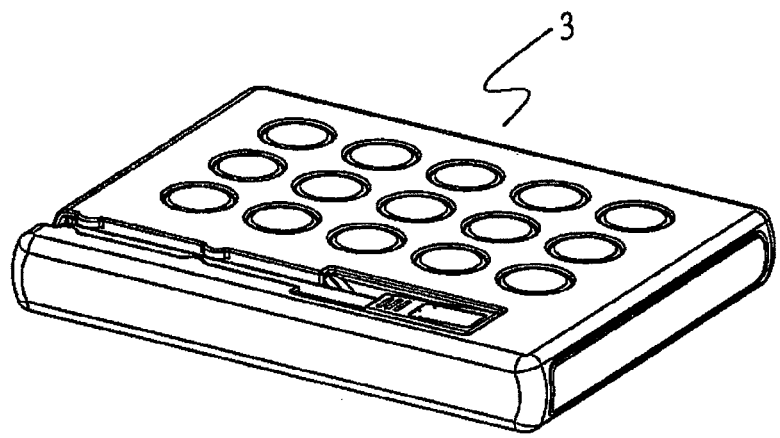

Referring to FIGS. 1-1, 1-2 and 1-3, it shows a three-dimensional schematic view and two three-dimensional exploded views of an external hard disk box of the present invention. As shown in the drawings, a desktop external hard disk box 1 of the present invention comprises an upper box 10, a lower box 11, plural soft silicon rings 12, two soft silicon covers 13, a circuit board assembly 14 and a hard disk A.

The upper box 10 and the lower box 11 are provided respectively with positioning grooves 101 and 111 for the soft silicon rings 12. The silicon rings 12 are sheathed after the upper and lower boxes have been covered together, achieving a function of fixing the upper and lower boxes and facilitating dismantling.

Each of two sides of the hard disk A is provided with one soft silicon cover 13. The silicon covers 13 are sheathed on the hard disk A and then the circuit board assembly 14 is loaded and put into a holding space between the upper and lower boxes, allowing the hard disk box 1 to have a shock-proofing function at each direction.

Referring to FIG. 1-4 at a same time, it shows a schematic view of a stack of the desktop external hard disk box 1 of the present invention. Through grooves 121 and pillars 122 on the soft silicon rings 12, the external hard disk box 1 can be stacked up stably. In addition, the pillars 122 can also act as foot pads, preventing the hard disk box from sliding to damage outer surfaces while using the hard disk box.

Referring to FIGS. 2-1, 2-2 and 2-3, it shows a three-dimensional schematic view and two three-dimensional exploded views of a round-line portable external hard disk box which is another embodiment of the present invention. As shown in the drawings, a round-line portable external hard disk box 2 of the present invention comprises a soft silicon cover 20, an upper box 21, a box fixing ring 22, a lower box 23, a circuit board assembly 24, a data transmission line 25 and a hard disk A.

The soft silicon cover 20 is provided with a holding slot 201 for the data transmission line 25, plural cosmetic holes 202 and plural foot pads 203. The soft silicon cover 20 can tightly sheath the box, allowing the box to be assembled completely without using screws or any latching means, such that the box can be dismantled conveniently and can achieve a good shock-proofing effect.

The upper box 21 is provided with plural cosmetic bosses 211, allowing an outer shape of the hard disk box to be more beautiful.

The lower box 23 is provided with plural positioning bosses 231 to position the hard disk A, such that the hard disk A will not move between the upper and lower boxes.

Figures 1, 2:
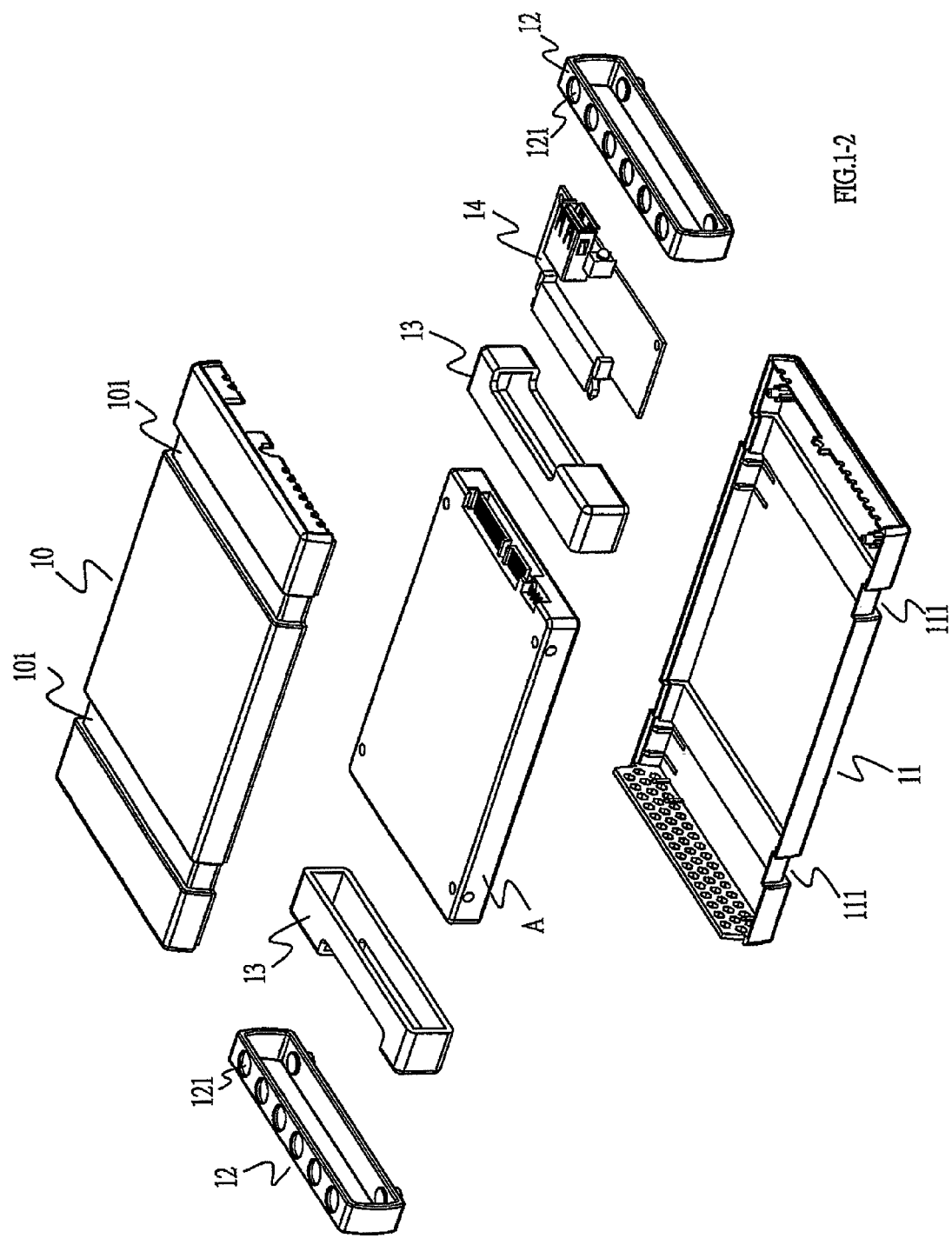
Figures 1, 2, 3:
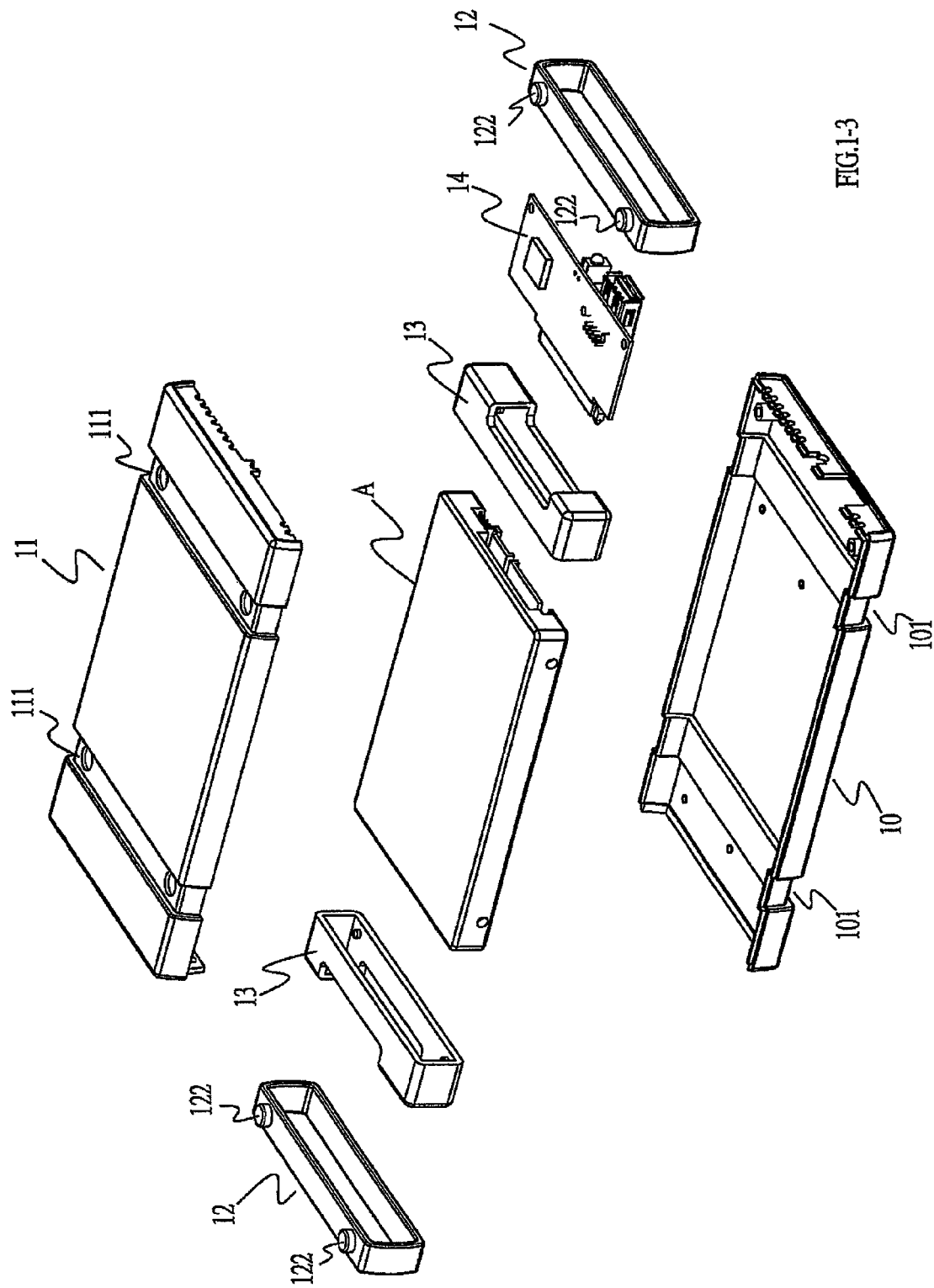
Figures 1, 2, 3, 4:
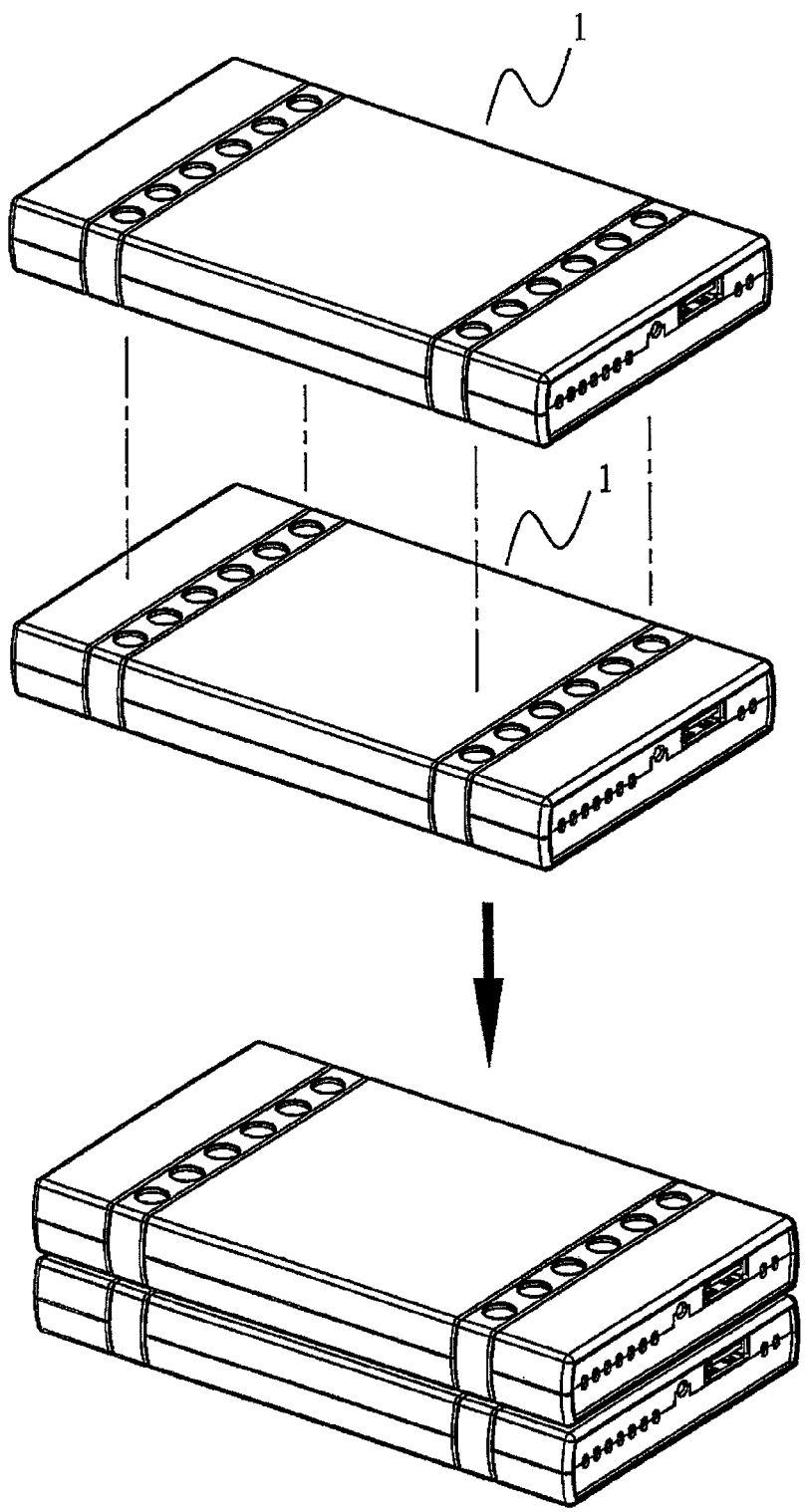
Figure 2:
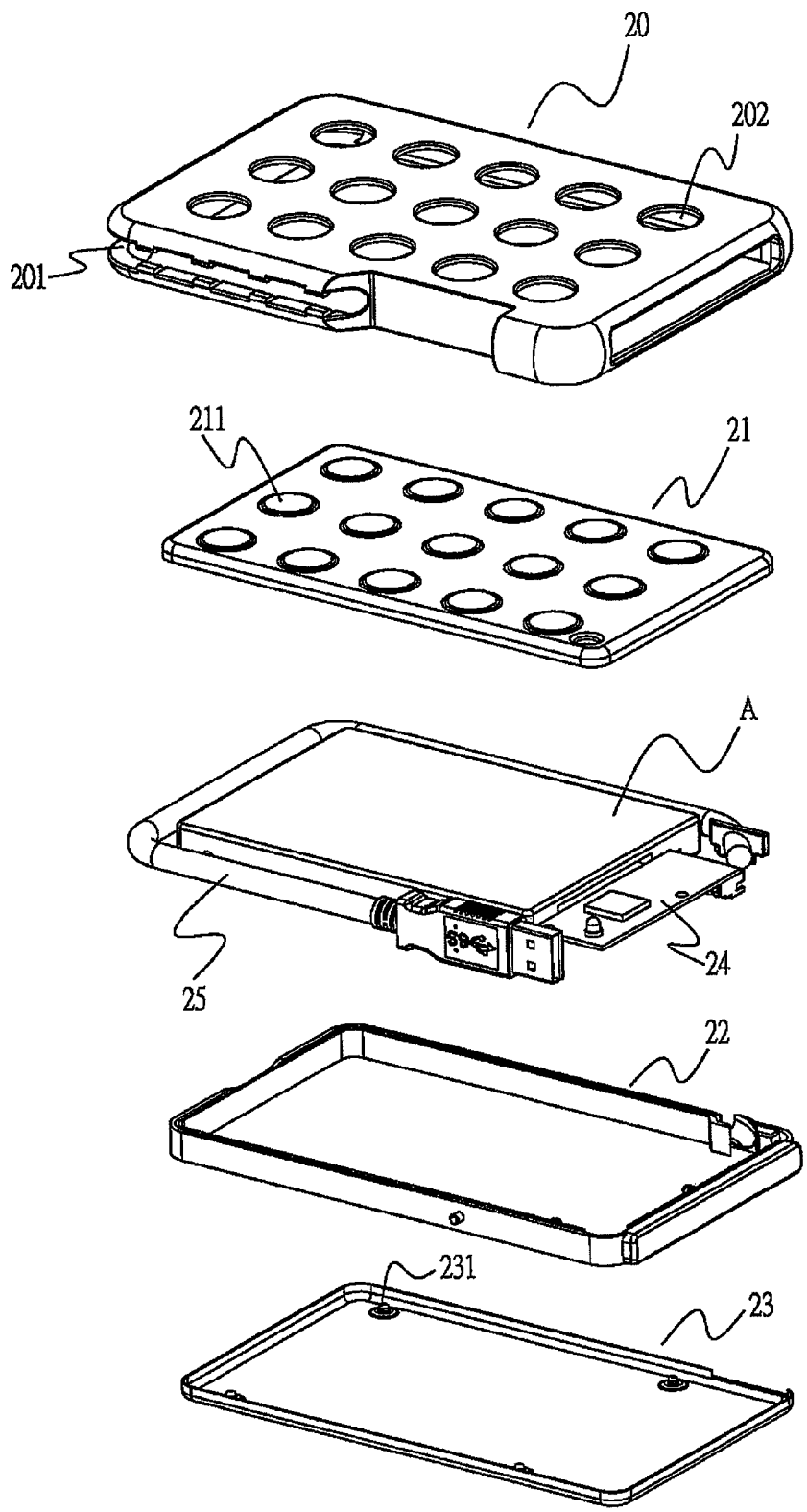
Figures 2, 3:
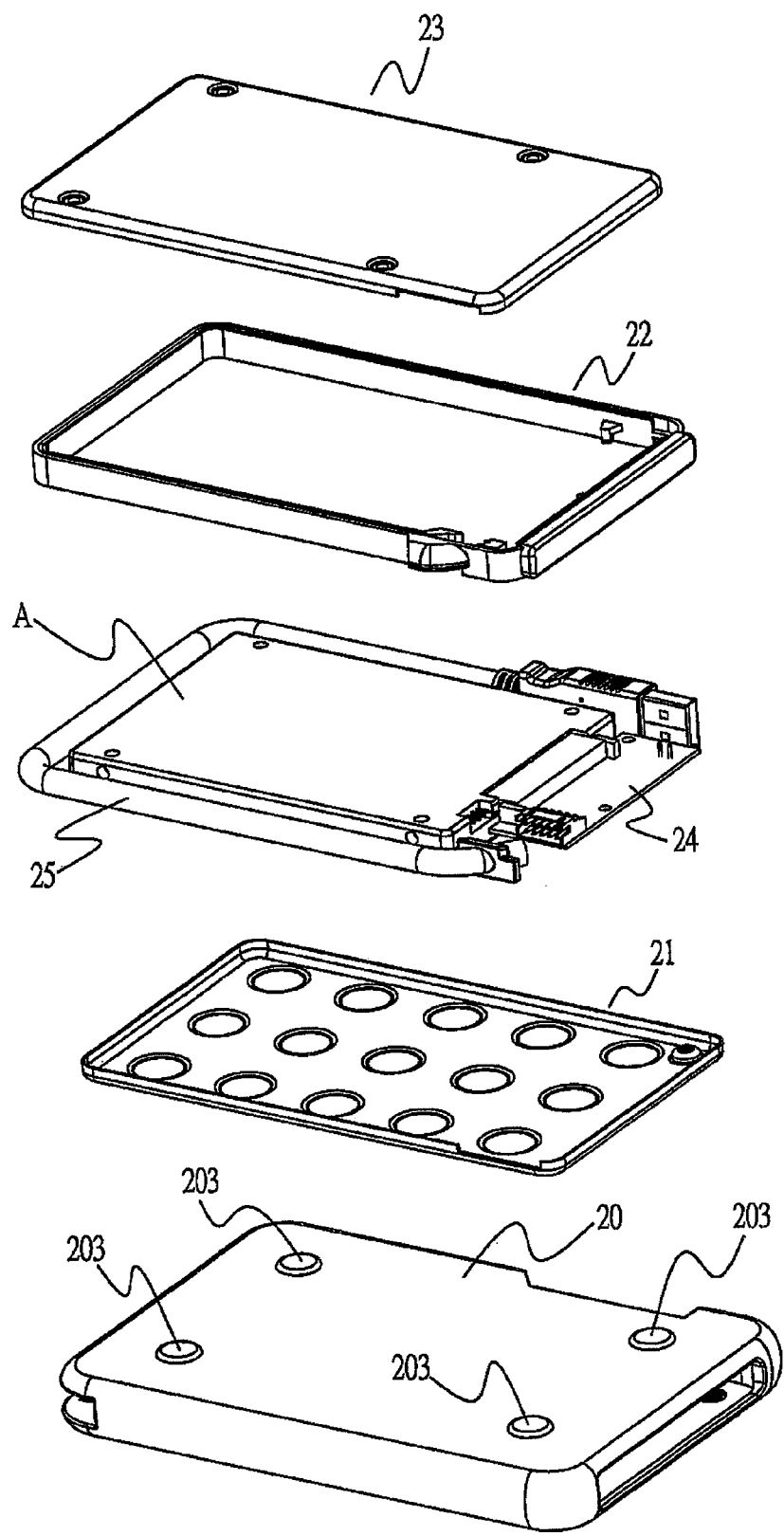
Figures 2, 3, 4:
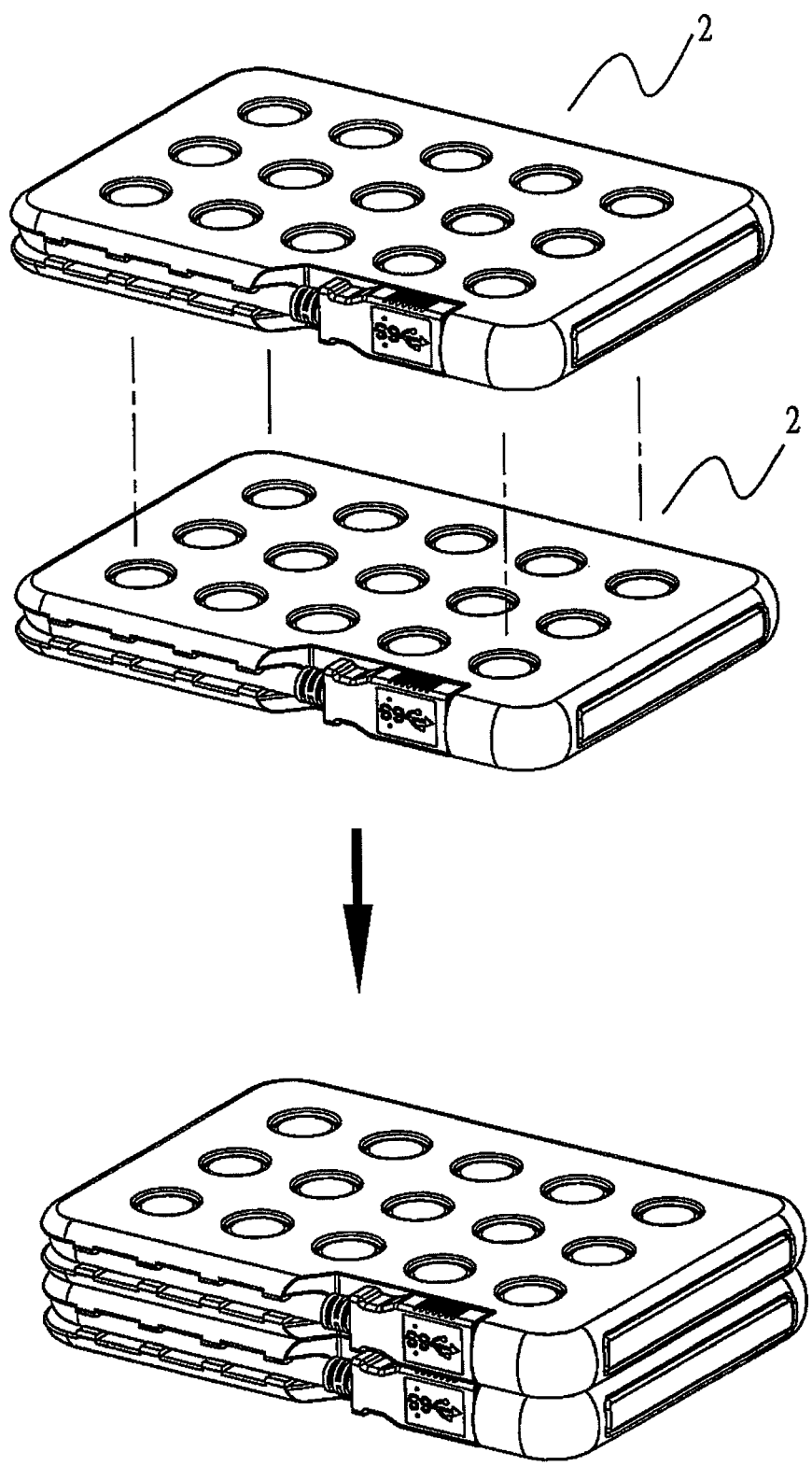
Figures 2, 3:
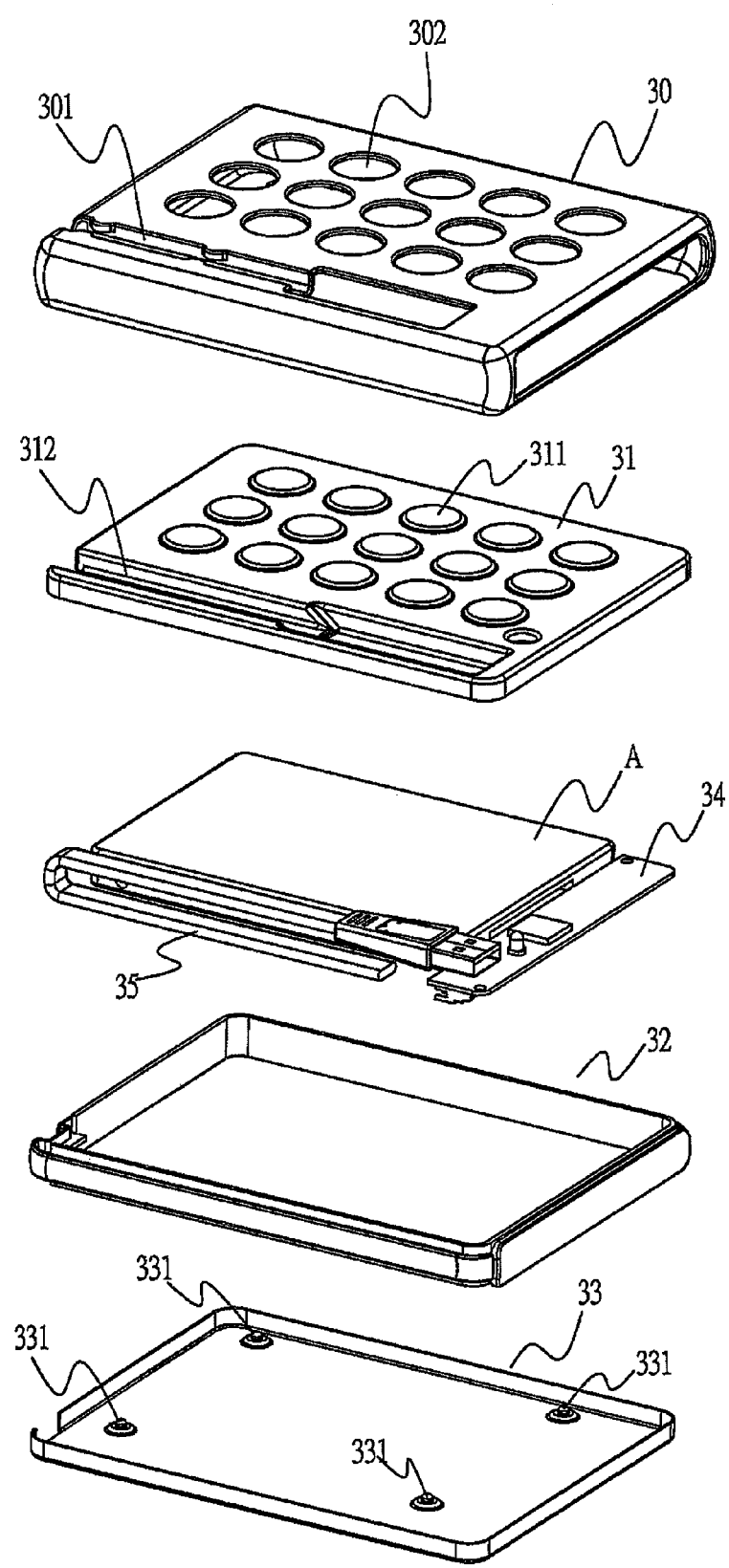
Figure 3:
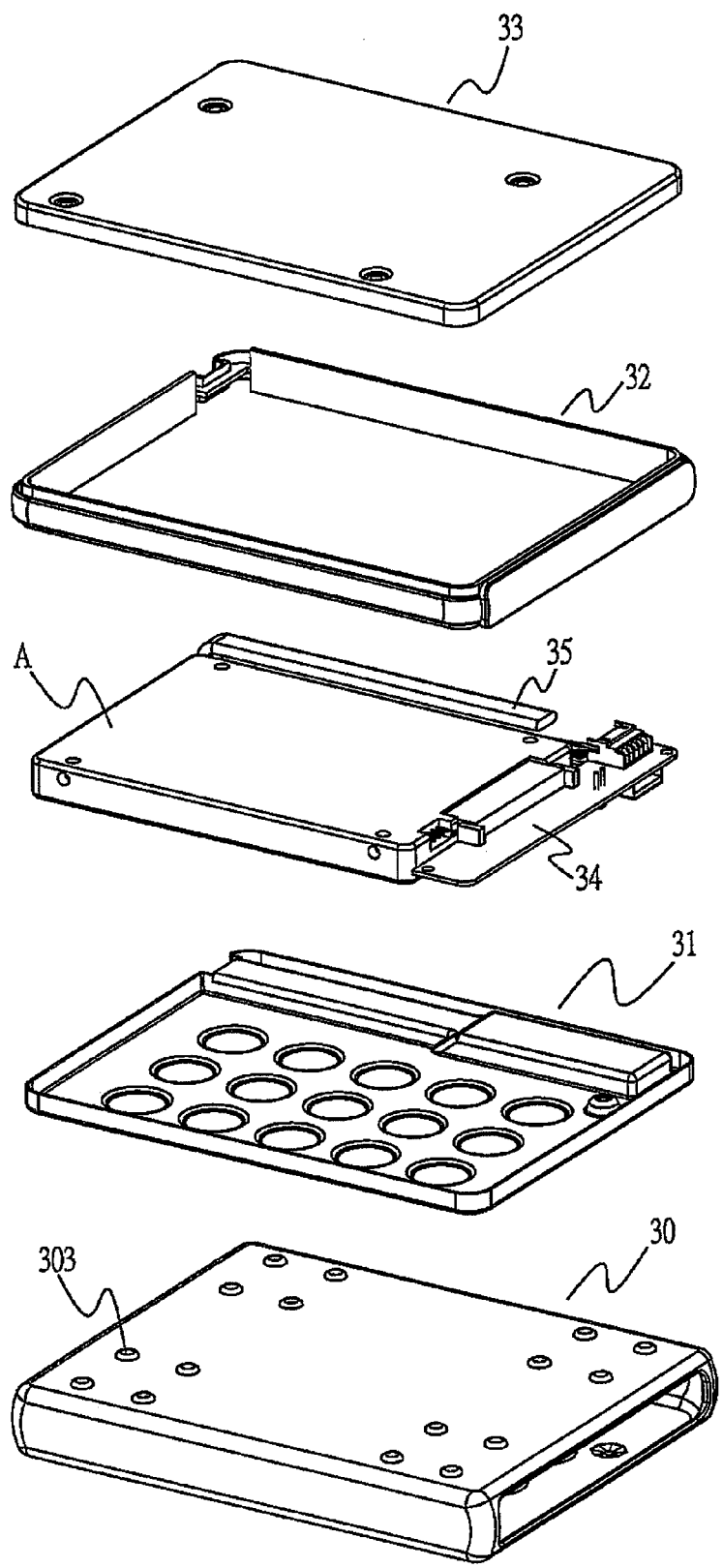

Referring to FIG. 2-4 at a same time, it shows a schematic view of a stack of the round-line portable external hard disk box 2 of the present invention. Through the cosmetic holes 202 and the foot pads 203 on the soft silicon cover 20, the hard disk box 2 can be stacked up stably.

Referring to FIGS. 3-1, 3-2 and 3-3, it shows a three-dimensional schematic view and two three-dimensional views of a flat-line portable hard disk box which is still another embodiment of the present invention. As shown in the drawings, a flat-line portable hard disk box 3 of the present invention comprises a soft silicon cover 30, an upper box 31, a box fixing ring 32, a lower box 33, a circuit board assembly 34, a data transmission line 35 and a hard disk A.

The soft silicon cover 30 is provided with a holding slot 301 for the data transmission line 35, plural cosmetic holes 302 and plural foot pads 303. The soft silicon cover 30 can tightly sheath the box, allowing the box to be assembled completely without using screws or any latching means, such that the box can be dismantled conveniently and can achieve a good shock-proofing effect.

The upper box 31 is provided with plural cosmetic bosses 311, allowing an outer shape of the hard disk box to be more beautiful. The upper box 31 also includes a yield slot 312 to accommodate the flat data transmission line 35.

The lower box 33 is provided with plural positioning bosses 331 to position the hard disk A, such that the hard disk A will not move between the upper and lower boxes.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An external hard disk box comprising a box, an upper cover and a lower cover of which are positioned and fixed by soft silicon rings or silicon covers, wherein a top of the silicon ring or silicon cover is provided with grooves and a bottom is provided with pillars which act as foot pads to connect with the grooves of another external hard disk box, thereby achieving an effect of stacking up plural external hard disk boxes.

2. The external hard disk box according to claim 1, wherein the soft silicon cover is provided with a holding space to accommodate a data transmission line.

* * * * *